(12) United States Patent
Takahashi

(10) Patent No.: US 7,855,369 B2
(45) Date of Patent: Dec. 21, 2010

(54) RADIATION IMAGING ELEMENT

(75) Inventor: Toshiro Takahashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1 day.

(21) Appl. No.: 12/292,482

(22) Filed: Nov. 20, 2008

(65) Prior Publication Data
US 2009/0134336 A1 May 28, 2009

(30) Foreign Application Priority Data
Nov. 26, 2007 (JP) .............................. 2007-304906

(51) Int. Cl.
*G01T 1/24* (2006.01)
(52) U.S. Cl. ................................. 250/370.01
(58) Field of Classification Search ............ 250/370.01, 250/370.08; 257/52, 57, 59, 72
See application file for complete search history.

(56) References Cited
U.S. PATENT DOCUMENTS

| | | | |
|---|---|---|---|
| 4,766,471 A * | 8/1988 | Ovshinsky et al. ............. 257/53 |
| 5,210,045 A * | 5/1993 | Possin et al. ................. 438/158 |
| 5,614,731 A * | 3/1997 | Uchikoga et al. ............. 257/59 |
| 5,874,745 A * | 2/1999 | Kuo ............................. 257/59 |
| 7,462,862 B2 * | 12/2008 | Hoffman et al. .............. 257/43 |
| 7,541,626 B2 * | 6/2009 | Kim et al. .................... 257/213 |
| 7,564,055 B2 * | 7/2009 | Hoffman ...................... 257/43 |
| 7,601,984 B2 * | 10/2009 | Sano et al. ..................... 257/57 |
| 2003/0218222 A1 * | 11/2003 | Wager et al. ................. 257/410 |
| 2007/0090365 A1 * | 4/2007 | Hayashi et al. ............... 257/72 |
| 2009/0065771 A1 * | 3/2009 | Iwasaki et al. ................ 257/43 |
| 2009/0134389 A1 * | 5/2009 | Matsunaga .................... 257/43 |
| 2009/0189153 A1 * | 7/2009 | Iwasaki et al. ................ 257/43 |

FOREIGN PATENT DOCUMENTS

JP   A 2005-101193   4/2005
JP   A 2006-165529   6/2006

OTHER PUBLICATIONS

Electronic translation of JP 2006-165529 A.*
Song et al., Transparent amorphous indium zinc oxide thin-film transistors fabricated at room temperature, 2007, Applied Physics Letters, 90, 022106, pp. 1-3.*
IDW/AD'05, pp. 845-846 (Dec. 6, 2005).
Nature, vol. 432, pp. 488-492, Nov. 25, 2004.

* cited by examiner

*Primary Examiner*—David P Porta
*Assistant Examiner*—Djura Malevic
(74) *Attorney, Agent, or Firm*—Solaris Intellectual Property Group, PLLC

(57) ABSTRACT

A radiation imaging element that includes radiation sensors disposed in a matrix so as to output signal charges corresponding to radiation transmitted through a subject, and TFTs for readout of signals from the radiation sensors, wherein
the TFT has at least a gate electrode, a gate insulating layer, an active layer, a source electrode and a drain electrode,
the active layer has at least a first region and a second region which has an electric conductivity larger than an electric conductivity of the first region,
the second region is in contact with the gate insulating layer, and
the first region is disposed so as to be electrically connected between the second region and at least one of the source electrode or the drain electrode.

A radiation imaging element that effectively suppresses noise and also achieves a high quality image is provided.

14 Claims, 2 Drawing Sheets

RADIATION IMAGING ELEMENT

CROSS REFERENCE TO RELATED APPLICATION

This application claims priority under 35 USC 119 from Japanese Patent Application No. 2007-304906, the disclosure of which is incorporated herein by reference.

BACKGROUND OF THE INVENTION

1. Field of the Invention

The present invention relates to a radiation imaging element, and specifically, relates to a radiation imaging element that converts an amount of radiation transmitted through a subject directly into an electrical signal by use of a radiation sensor.

2. Description of the Related Art

An imaging apparatus that uses a radiation imaging element is used in broad fields including the medical field, the industrial field and the atomic energy field. In a radiation imaging apparatus, radiation is irradiated to a subject, and an intensity of radiation transmitted through the subject is detected to obtain information about the interior of the subject. The radiation imaging apparatus is broadly classified into a direct type imaging apparatus and an indirect type imaging apparatus. In the direct type imaging apparatus, radiation transmitted through a subject is converted directly into an electrical signal to be externally extracted, and, in the indirect type imaging apparatus, radiation transmitted through a subject is first made to be incident on a phosphor and converted into visual light, and thereafter the visual light is converted into an electrical signal to be externally extracted.

In a radiation imaging element used in the direct type imaging apparatus, incident radiation (such as X-rays) is converted directly into an electrical signal (electric charge) by means of an a-Se-based semiconductor layer sensitive to the radiation. For instance, FIG. 5 of Japanese Patent Application Laid-Open (JP-A) No. 2005-101193 is a schematic sectional diagram showing a fundamental configuration of a direct conversion type radiation sensor. The radiation sensor includes:

an active matrix substrate 51, which has multiple collecting electrodes (not shown in the figure) formed in a two-dimensional matrix arrangement disposed in an effective area SA for detection of radiation on a surface of the substrate, and an electric circuit (not shown in the figure) for storage/readout of the electric charges which are collected at the respective collecting electrodes in response to the incidence of radiation;

an a-Se-based semiconductor layer 52, which is sensitive to radiation, and is laminated on a side of the active matrix substrate 51 having the collecting electrodes; and a common electrode 53 for applying a bias voltage laminated widely in a planar form on a front side of the a-Se-based semiconductor layer 52.

When a bias voltage is applied from a bias feed power source to the common electrode 53, in a state of applying the bias voltage to the common electrode, electric charges are generated by the radiation-sensitive a-Se-based semiconductor layer 52 corresponding to an incidence of radiation transmitted through a subject to be detected, and collected by the respective collecting electrodes, and then the electric charges are extracted as a radiation detection signal for each of the collecting electrodes by an electric circuit for storage/readout, comprising a capacitor, a switching element, electric wiring, and the like.

That is, in the case of a direct conversion type radiation sensor, respective collecting electrodes arranged in a two-dimensional matrix are electrodes (pixel electrodes) respectively corresponding to respective pixels of a radiation image, and, thereby, radiation detection signals capable of forming a radiation image in accordance with a two-dimensional intensity distribution of radiation projected on an effective area SA for detection of radiation can be taken out.

However, a direct conversion type radiation imaging element involves a large amount of noise, and therefore, an exposure amount of radiation has to be increased in order to obtain a high quality image, which is a problem. Therefore, an improvement of the direct conversion type radiation sensor is demanded.

On the other hand, to make the element thinner, lighter, and more resistant to breakage, attempts are being made to use a resin substrate, which is light in weight and flexible, instead of a glass substrate.

However, fabrication of the transistors using thin films of silicon described above requires a thermal treatment process at a relatively high temperature, and it is difficult to form the transistors directly on a resin substrate which is generally low in heat resistance.

Hence, such TFTs have been actively developed using, as a semiconductor thin film, a film of an amorphous oxide, such as an In—Ga—Zn—O-based amorphous oxide, which can be formed at a low temperature (see, for example, JP-A No. 2006-165529 and IDW/AD'05, pages 845-846 (Dec. 6, 2005)).

As the films for a TFT made with an amorphous oxide semiconductor can be formed at room temperature, the TFT can be prepared on a film (flexible substrate). Therefore, amorphous oxide semiconductors have been attracting attention as a material for active layers of film (flexible) TFTs lately. Particularly, Prof. Hosono et al. of the Tokyo Institute of Technology have reported that a TFT formed using a-IGZO has a field effect mobility of about 10 cm$^2$/Vs even on a PEN substrate, which is higher than that of an a-Si TFT on glass. Since then, TFTs formed using an amorphous oxide semiconductor have particularly drawn attention, especially as film TFTs (see for example, NATURE, vol. 432, pages 488-492, Nov. 25, 2004).

However, in the case of using a TFT formed using a-IGZO, as, for example, a drive circuit of a display, there are problems in that mobility ranges from 1 cm$^2$/Vs to 10 cm$^2$/Vs, which provides insufficient performance, the OFF current is high, and the ON-OFF ratio is low. Particularly, in order to apply such a TFT to a display incorporating an organic EL element, further increase in mobility and improvement in ON-OFF ratio are required.

SUMMARY OF THE INVENTION

The present invention has been made in view of the above circumstances and provides a radiation imaging element with the following aspect.

An aspect of the invention provides a radiation imaging element comprising radiation sensors disposed in a matrix so as to output signal charges corresponding to radiation transmitted through a subject, and thin film field effect transistors for readout of signals from the radiation sensors, wherein the thin film field effect transistor comprises at least a gate electrode, a gate insulating layer, an active layer, a source electrode and a drain electrode, the active layer comprises at least a first region and a second region which has an electric conductivity larger than an electric conductivity of the first region, the second region is in contact with the gate insulating layer, and the first region is disposed so as to be electrically connected between the second region and at least one of the source electrode or the drain electrode.

DETAILED DESCRIPTION OF THE INVENTION

Figure 1:
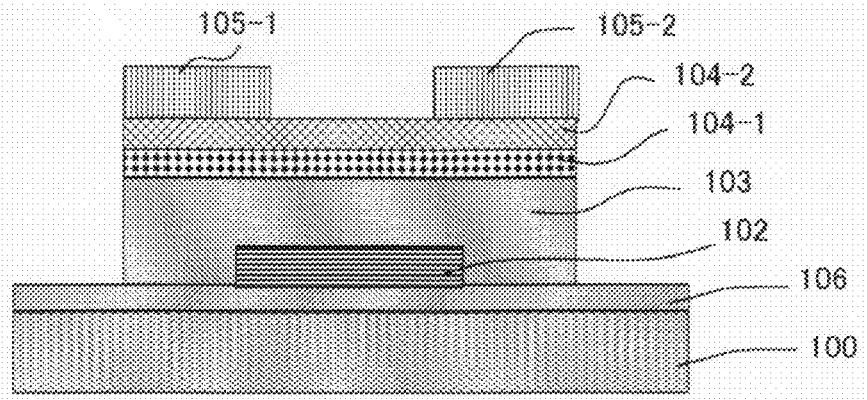
FIG. 1 is a schematic sectional view showing the structure of a thin film field effect transistor used in an embodiment of the present invention.

A higher image quality is required for a direct conversion type radiation image, and therefore, it is intended to eliminate noise in a direct conversion type imaging element. Causes of the noise are classified into "quantum noise" and "electric noise". The latter is further classified into "noise caused by an imaging element" and "noise caused by wiring resistance and capacitance of a line". The noise caused by an imaging element is caused by a leakage current of a sensor layer or by an OFF current of a thin film field effect transistor (hereinafter, in some cases, referred to as a "TFT") used in a switching element. In particular, an OFF current of a TFT is one component of the reasons for noise generation, and therefore, it is an object of the invention to prevent the OFF current of a TFT.

The present invention has been made in view of the above circumstances and provides a radiation imaging element that effectively suppresses noise and is capable of obtaining high image quality.

The object of the invention is achieved by a radiation imaging element that includes radiation sensors disposed in a matrix so as to output signal charges corresponding to radiation transmitted through a subject and thin film filed effect transistors for readout of signals from the radiation sensors, wherein the thin film field effect transistor has at least a gate electrode, a gate insulating layer, an active layer, a source electrode and a drain electrode, and the active layer has at least a first region and a second region which has an electric conductivity larger than an electric conductivity of the first region, wherein the second region is in contact with the gate insulating layer, and the first region is disposed so as to be electrically connected between the second region and at least one of the source electrode or the drain electrode.

Preferably, at least the first region and the second region are each formed as a layer on a substrate of the thin film field effect transistor, wherein the layer of the second region is in contact with the gate insulating layer, and the layer of the first region is in contact with at least one of the source electrode or the drain electrode.

Preferably, the layer of the first region is thicker than the layer of the second region.

Preferably, an electric conductivity continuously changes between the first region and the second region in the active layer.

Preferably, the active layer includes an oxide semiconductor. More preferably, the oxide semiconductor is an amorphous oxide semiconductor.

Preferably, an oxygen concentration of the second region is lower than an oxygen concentration of the first region.

Preferably, the oxide semiconductor includes at least one selected from the group consisting of In, Ga and Zn or a composite oxide thereof.

Preferably, the oxide semiconductor comprises In and Zn, and a composition ratio of Zn to In (expressed by a ratio Zn/In of Zn to In) of the first region is larger than a composition ratio Zn/In of the second region.

Preferably, the electric conductivity of the second region is $10^{-4}$ Scm$^{-1}$ or more and less than $10^2$ Scm$^{-1}$. More preferably, the electric conductivity of the second region is $10^{-1}$ Scm$^{-1}$ or more and less than $10^2$ Scm$^{-1}$.

Preferably, a ratio of the electric conductivity of the second region to the electric conductivity of the first region (electric conductivity of second region/electric conductivity of first region) is from $10^1$ to $10^{10}$, more preferably from $10^2$ to $10^{10}$, and even more preferably from $10^2$ to $10^8$.

Preferably, the substrate is a flexible resin substrate.

According to the present invention, a radiation imaging element that effectively suppresses noise and is capable of obtaining high image quality is provided.

Next, an embodiment of the present invention will be described with reference to the drawings.

Figure 4:
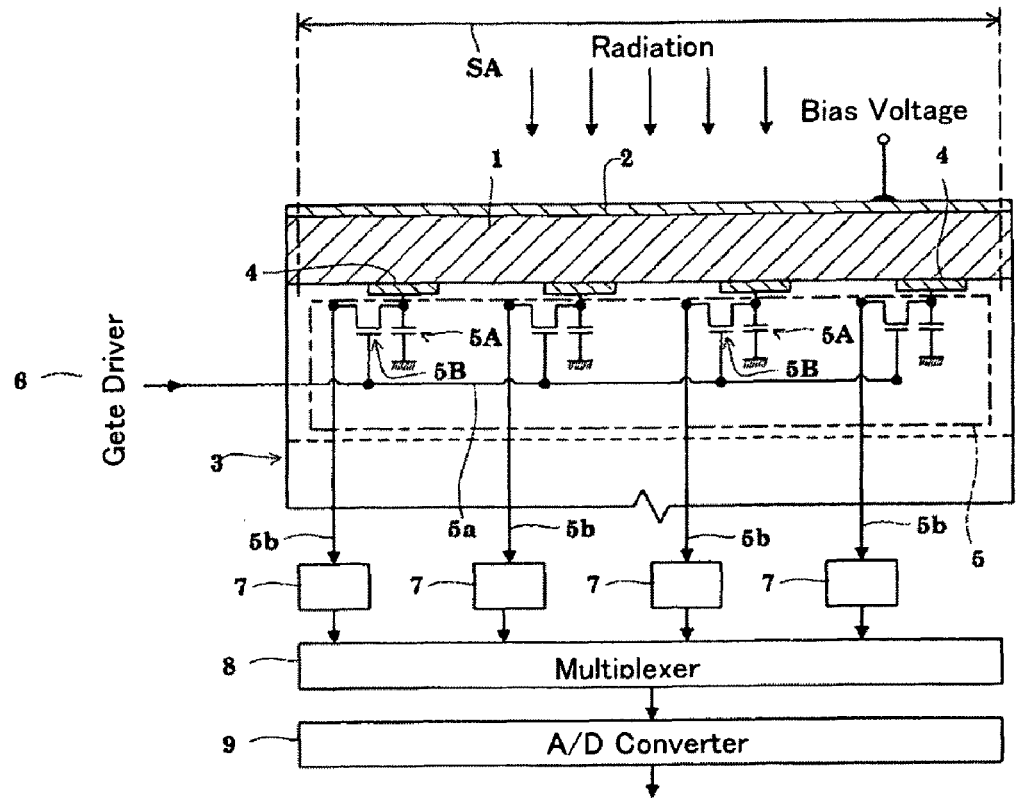
FIG. 4 is a schematic sectional view showing a configuration of a portion of four pixels of a radiation imaging element according to an embodiment of the present invention.
Figure 5:
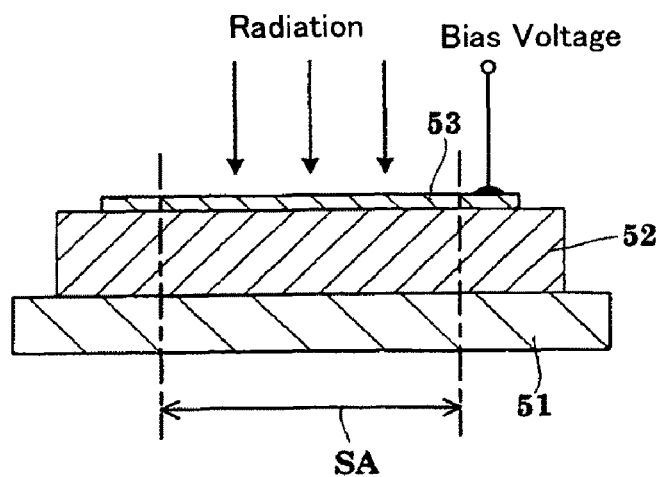
FIG. 5 is a schematic sectional view showing a fundamental configuration of a radiation sensor portion.

FIG. 4 is a schematic sectional diagram showing a configuration of a portion of four pixels of a radiation imaging element according to the embodiment of the invention.

A radiation sensor portion includes a selenium-based (Se-based) amorphous semiconductor layer (a-Se-based semiconductor layer) 1 sensitive to radiation and a common electrode 2 for applying a bias voltage disposed so as to be laminated in a planar form on a surface of the a-Se-based semiconductor layer 1.

A collecting electrode 4 which collects generated electric charges is formed on a surface thereof in a two-dimensional matrix arrangement disposed in an effective area SA for detection of radiation.

An electric circuit 5 for storage/readout of electric charges collected by the collecting electrodes 4 is disposed thereon.

These elements are disposed on an active matrix substrate 3, and the a-Se-based semiconductor layer 1 is laminated on a side of the active matrix substrate 3 having the collecting electrodes 4.

<Radiation Sensor Portion>

The radiation sensor portion according to the present invention includes a Se-based amorphous semiconductor layer sensitive to radiation and a common electrode for applying a bias voltage formed to be widely laminated in a planar form on a front side of the Se-based amorphous semiconductor layer, wherein, in a state of applying a bias voltage to the common electrode, as radiation to be detected is inputted, electric charges are generated inside of the Se-based amorphous semiconductor layer sensitive to the radiation. Since the Se-based amorphous semiconductor layer is easy to produce with a large area, a wide effective area for detection of radiation is readily obtained.

<Signal Output Portion>

On a surface of the substrate 3 below the collecting electrode 4 of each of the pixel portions, a signal output portion 5 is formed. The signal output portion 5 includes a capacitor 5A that stores electric charges collected by the collecting electrode 4, and a thin film field effect transistor (hereinafter, in some cases, simply referred to as a "thin film transistor" or "TFT") 5B that converts electric charges stored in the capacitor 5A into a voltage signal to output. The region where the capacitor 5A and the thin film transistor 5B are formed has a portion overlapping with the collecting electrode 4 in plane view, and due to such a configuration, the signal output portion and the radiation sensor portion in each of the pixel portions are disposed overlapped in a thickness direction so as to be able to be disposed over a broad area of the radiation sensor portion.

<Thin Film Field Effect Transistor Portion>

The thin film field effect transistor used in the invention is an active element which has at least a gate electrode, a gate insulating layer, an active layer, a source electrode and a drain electrode in this order, and has a function of switching current between the source electrode and the drain electrode, in which the current passing through the active layer is controlled by applying voltage to the gate electrode. As the TFT structure, either of a stagger structure (hereinafter, sometimes referred to as a top gate structure) and a reversed stagger structure (hereinafter, sometimes referred to as a bottom gate structure) may be formed.

The active layer of the TFT used in the invention has at least a first region and a second region which has an electric conductivity larger than an electric conductivity of the first region, wherein the first region is in contact with the gate insulating layer, and the first region is disposed so as to be electrically connected between the second layer and at least one of the source electrode or the drain electrode.

FIG. 1 is a schematic sectional view showing the structure of the preferable embodiment of the invention, wherein at least the first region and the second region are formed in layer on a substrate, and a layer of the second region is in contact with the gate insulating layer, and a layer of the first region is in contact with at least one of the source electrode or the drain electrode.

Further, it is preferable in view of improvement in operation stability that the first region is thicker than the second region.

Also, another embodiment in which an electric conductivity continuously changes in the active layer between the first region and the second region is preferable.

Preferably, the second region has an oxygen concentration lower than that of the first region.

Preferably, the active layer includes an oxide semiconductor. Preferably, the oxide semiconductor is an amorphous oxide semiconductor selected from the group consisting of indium (In), gallium (Ga) and zinc (Zn), or a composite oxide thereof. More preferably, the oxide semiconductor includes indium and zinc, and a composition ratio of zinc (Zn) to indium (In), i.e., Zn/In, in the first region is larger than that in the second region. The ratio of Zn/In of the first region is preferably larger than that of the second region by 3% or more, and more preferably larger by 10% or more.

Preferably, a ratio of the electric conductivity of the second region to the electric conductivity of the first region (i.e., electric conductivity of second region/electric conductivity of first region) is from $10^1$ to $10^{10}$, and more preferably, from $10^2$ to $10^{10}$, and even more preferably, from $10^2$ to $10^8$.

Preferably, the electric conductivity of the second region is $10^{-4}$ Scm$^{-1}$ or more and less than $10^2$ Scm$^{-1}$, and more preferably $10^{-1}$ Scm$^{-1}$ or more and less than $10^2$ Scm$^{-1}$. The electric conductivity of the first region is preferably $10^{-2}$ Scm$^{-1}$ or less, and more preferably $10^{-9}$ Scm$^{-1}$ or more and less than $10^{-4}$ Scm$^{-1}$.

In the case where the electric conductivity of the second region is less than $10^{-4}$ Scm$^{-1}$, high field effect mobility can not be obtained. On the contrary, in the case where the electric conductivity of the second region is $10^2$ Scm$^{-1}$ or more, OFF current is increased, and thus a good ON-OFF ratio cannot be obtained. Therefore, these conditions are not preferable.

1) Structure

Next, the structure of the thin film field effect transistor according to the invention will be described in detail with reference to the drawings.

FIG. 1 is a schematic sectional view showing an example of the reversed stagger structure of the thin film field effect transistor according to the invention. In the case where a substrate 100 is composed of a flexible substrate such as a plastic film or the like, the thin film field effect transistor has an insulating layer 106 disposed on one surface of the substrate 100, and on the insulating layer 106, a gate electrode 102, a gate insulating layer 103, a second region 104-1, and a first region 104-2 are stacked. On the surface of the structure thus constructed, a source electrode 105-1 and a drain electrode 105-2 are disposed. The second region 104-1 is in contact with the gate insulating layer 103, and the first region 104-2 is in contact with the source electrode 105-1 and the drain electrode 105-2. The compositions of the second region 104-1 and first region 104-2 are determined so that the electric conductivity of the second region 104-1 is higher than that of the first region 104-2 when no voltage is applied to the gate electrode.

For the second region and the first region, oxide semiconductors disclosed in JP-A No. 2006-165529, for example, In—Ga—Zn—O-based oxide semiconductors are used. An amorphous oxide semiconductor is more preferable. For example, oxides containing at least one of In, Ga and Zn (for example, such as In—O group) are preferable, oxides containing at least two of In, Ga and Zn (for example, such as In—Zn—O group, In—Ga group, or Ga—Zn—O group) are more preferable, and oxides containing In, Ga and Zn are particularly preferable. As In—Ga—Zn—O-based amorphous oxides, amorphous oxides having a composition expressed by $InGaO_3(ZnO)_m$ (m: a natural number less than 6) in a crystalline state are preferred, and in particular, $InGaZnO_4$ is more preferred. It is known that in these oxide semiconductors, the higher the concentration of electron carriers is, the higher the electron mobility is. In other words, the higher the electric conductivity is, the higher the electron mobility is.

According to this structure in the invention, when the thin film field effect transistor in the ON state under the condition where voltage is applied to the gate electrode, the second region which becomes a channel has high electric conductivity. As a result, the field effect mobility of the transistor is increased and a large ON current can be obtained. On the other hand, in the OFF state, the first region has a high resistance because of its low electric conductivity, and the OFF current is kept low. Thus, the ON-OFF ratio is remarkably improved.

Figure 2:
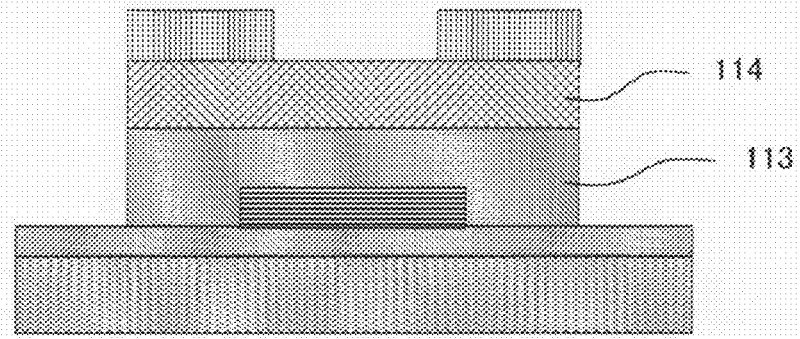
FIG. 2 is a schematic sectional view showing the structure of a conventional thin film field effect transistor.

FIG. 2 is a schematic sectional view showing an example of a conventional thin film field effect transistor with a reversed stagger structure. The active layer 114 has no particular distribution of the electric conductivity in the direction of its thickness. With the conventional arrangement, the resistance value of the active layer 114 needs to be lowered to reduce OFF current, and it is required to decrease the carrier concentration of the active layer 114. JP-A No. 2006-165529 discloses that to achieve a good ON-OFF ratio, the concentration of electron carriers needs to be made less than $10^{18}$ cm$^{-3}$, and more preferably less than $10^{16}$ cm$^{-3}$ for reducing the electric conductivity of the amorphous oxide semiconductor in the active layer 114. However, as is shown in FIG. 2 of JP-A No. 2006-165529, in In—Ga—Zn—O-based oxide semiconductors, a decrease in the concentration of electron carriers causes reduced electron mobility of the film. On this account, a field effect mobility of the TFT of 10 cm$^2$/Vs or higher cannot be obtained, and it is impossible to gain a sufficient ON current. Therefore, as to the ON-OFF ratio, sufficient characteristics cannot be obtained.

On the other hand, raising the concentration of electron carriers of the oxide semiconductor of the active layer 114 to increase the electron mobility of the film increases the electric conductivity of the active layer 114, increases the OFF current, and worsens the characteristics of ON-OFF ratio.

Although it is not shown in the drawing, the point of the invention is to provide a structure, wherein an active layer is disposed so that an electric conductivity of the active layer near the gate insulating layer is larger than an electric conductivity of the active layer near the source electrode and drain electrode. As long as this condition is achieved, the means for achieving this is not limited to providing a plurality of active layers as shown in FIG. 1. The electric conductivity of the semiconductor layer may change continuously.

Figure 3:
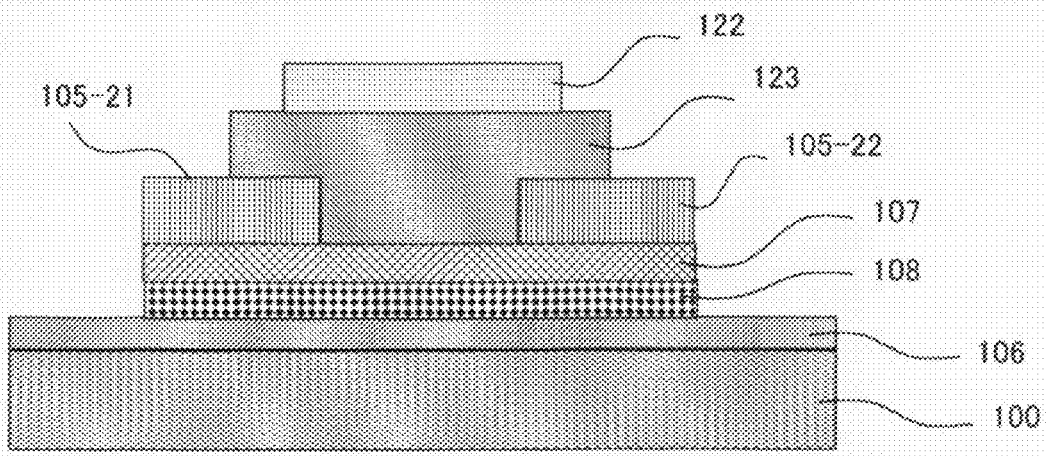
FIG. 3 is a schematic sectional view showing the structure of another conventional thin film field effect transistor.

FIG. 3 is a schematic sectional view showing an example of the structure of a thin film field effect transistor with top gate structure for comparison. It is the structure disclosed in JP-A No. 2006-165529. An active layer is composed of a high oxygen concentration layer 107 and a low oxygen concentration layer 108. The high oxygen concentration layer 107 is a layer with a low electron carrier concentration, i.e., a layer with low electric conductivity. The low oxygen concentration layer 108 is a layer with a high electron carrier concentration, i.e., a layer with high electric conductivity. In this structure for comparison, the active layer bordering the gate insulating layer 123, which becomes a channel, is low in both electron carrier concentration and electron mobility. Therefore, the structure cannot achieve high field effect mobility.

EXAMPLES

In the following, the present invention will be explained by examples thereof, but the present invention is by no means limited by such examples.

Example 1

1. Preparation of Active Layer

<Condition 1>

Using a polycrystalline sintered body having a composition of InGaZnO$_4$ as a target, RF magnetron sputtering vacuum deposition was performed under the following conditions: flow rate of argon (Ar) of 12 sccm, flow rate of oxygen (O$_2$) of 0.2 sccm, RF power of 200 W, and pressure of 0.4 Pa.

<Condition 2>

Deposition was performed under similar conditions to those in the Condition 1 except that the flow rate of O$_2$ was changed to 1.2 sccm.

<Condition 3>

Deposition was performed under similar conditions to those in the Condition 1 except that the flow rate of O$_2$ was changed to 1.4 sccm.

<Condition 4>

Deposition was performed under similar conditions to those in the Condition 1 except that the flow rate of O$_2$ was changed to 1.5 sccm.

<Condition 5>

Deposition was performed under similar conditions to those in the Condition 1 except that the flow rate of O$_2$ was changed to 1.8 sccm.

Samples for measurement of physical properties were prepared under the same conditions as those in the Condition 1 to Condition 5 described above, in which a layer of 100 nm was provided directly on a non-alkali glass substrate (#1737, manufactured by Corning). The samples for measurement of physical properties were analyzed by a conventional X-ray diffraction method. As a result, it was verified that the resultant layers were amorphous layers. Electric conductivity, carrier concentration by a Hall effect measurement method, and composition ratio of each sample for measurement of physical properties were measured. The obtained results are shown in Table 1.

—Method of Measuring Electric Conductivity—

The electric conductivity of the sample for measurement of physical properties was determined by calculation based on measured sheet resistance and film thickness of the sample. Herein, when the sheet resistance is expressed by $\rho$ ($\Omega/\square$), and the film thickness is expressed by d (cm), the electric conductivity $\sigma$ (Scm$^{-1}$) is calculated by the equation $\sigma=1/(\rho \times d)$.

In the Example, under an environment of 20° C., the measurement was executed by a Loresta GP (manufactured by Mitsubishi Chemical Corp.) for a region of the samples for measurement of physical properties with sheet resistance less than $10^7 \Omega/\square$, and the measurement was executed by a Hiresta UP (manufactured by Mitsubishi Chemical Corp.) for a region of sheet resistance of $10^7 \Omega/\square$ or more. For measurement of film thickness of the sample for measurement of physical properties, a contact stylus-type surface profiler DekTak-6M (manufactured by ULVAC, Inc.) was used.

—Measurement of Carrier Concentration by Hall Effect Measurement Method—

The carrier concentration of the sample for measurement of physical properties was determined by executing Hall effect measurement using a ResiTest 8300 (manufactured by Toyo Corporation). The Hall effect measurement was executed under an environment of 20° C. By the Hall effect measurement, not only the carrier concentration but also the hole mobility of carrier can be determined.

—Method of Measuring Composition Ratio—

The composition ratio of the sample for measurement of physical properties was determined by RBS (Rutherford backscattering) analysis.

TABLE 1

| | Flow Rate of Oxygen (sccm) | Electric Conductivity (Scm$^{-1}$) | Concentration of Electron Carrier (cm$^{-3}$) | Hole Mobility (cm$^2$/Vs) | Composition Ratio |
|---|---|---|---|---|---|
| Condition 1 | 0.2 | $4.0 \times 10^1$ | $3 \times 10^{19}$ | 8.3 | In:Ga:Zn = 1.0:0.96:0.54 |
| Condition 2 | 1.2 | $2.6 \times 10^{-1}$ | $3 \times 10^{17}$ | 4.9 | |

TABLE 1-continued

|  | Flow Rate of Oxygen (sccm) | Electric Conductivity (Scm$^{-1}$) | Concentration of Electron Carrier (cm$^{-3}$) | Hole Mobility (cm$^2$/Vs) | Composition Ratio |
|---|---|---|---|---|---|
| Condition 3 | 1.4 | 5.7 × 10$^{-3}$ | 1 × 10$^{16}$ | 3.0 | |
| Condition 4 | 1.5 | 1.0 × 10$^{-4}$ | 5 × 10$^{14}$ | 1.3 | In:Ga:Zn = 1.0:0.93:0.57 |
| Condition 5 | 1.8 | 1.1 × 10$^{-9}$ | <10$^{11}$ | — | In:Ga:Zn = 1.0:0.95:0.63 |

It is shown in Table 1 that, in the sputtering layer of oxide semiconductor InGaZnO$_4$, the electric conductivity decreases and the hole mobility decreases by increasing the flow rate of oxygen during sputtering, that is, by increasing the oxygen concentration in the sputtering layer. Further, concerning the composition ratio, it is shown that the electric conductivity decreases and the hole mobility decreases by increasing the Zn/In ratio.

2. Preparation of TFT Element

Inventive TFT element Nos. 1 and 2 and comparative TFT element Nos. 1 and 2 each having a configuration shown in FIG. 1 were prepared.

As a substrate, a non-alkali glass substrate ((#1737, manufactured by Corning) was used. The substrate was subjected to ultrasonic cleaning with pure water for 15 minutes, acetone for 15 minutes, and pure water for 15 minutes in this order. On this substrate, using indium-tin oxide (ITO) target having an SnO$_2$ content of 10% by weight (indium:tin=95:5 (by molar ratio)), RF magnetron sputtering (conditions: temperature for film formation of 43° C., flow rate of sputtering gas Ar of 12 sccm, RF power of 40 W, and film-forming pressure of 0.4 Pa) was performed to form a thin ITO layer (with a thickness of 30 nm) as a gate electrode. Patterning of the ITO gate electrode was performed using a shadow mask during sputtering.

Next, on the gate electrode, the following gate insulating layer was formed.

Gate insulating layer: a gate insulating layer was provided by performing RF magnetron sputtering vacuum deposition of SiO$_2$ (conditions: target of SiO$_2$, temperature for film formation of 54° C., flow rates of sputtering gas Ar/O$_2$ of 12 sccm/2 sccm, RF power of 400 W, and film-forming pressure of 0.4 Pa) to form a layer having a thickness of 200 nm. Patterning of the SiO$_2$ gate insulating layer was performed using a shadow mask during sputtering.

On the gate insulating layer, a first active layer and second active layer comprising InGaZnO$_4$ were provided. In this structure, the first active layer corresponds to the second region 104-1 in FIG. 1, and the second active layer corresponds to the first region 104-2 in FIG. 1.

The deposition conditions and the deposition thicknesses of the first active layer and the second active layer in the inventive TFT element Nos. 1 and 2 and comparative TFT element No. 1 and 2 are shown in Table 2. The active layer of the comparative TFT element No. 1 is a single layer, and the comparative TFT element No. 1 has a configuration shown in FIG. 2. The deposition conditions of the active layer are in accordance with those described above in "1. Preparation of Active Layer". Patterning of the InGaZnO$_4$ active layer was performed, similar to that described above, using a shadow mask during sputtering.

Then, on the above active layer(s), ITO was deposited at a thickness of 40 nm, as a source electrode and a drain electrode, by RF magnetron sputtering (conditions: temperature for film formation of 43° C., flow rates of sputtering gas Ar of 12 sccm, RF power of 40 W, and film-forming pressure of 0.4 Pa). Patterning of the source electrode and drain electrode was performed using a shadow mask during sputtering. Thereby, inventive TFT element Nos. 1 and 2 and comparative TFT element Nos. 1 and 2 each having a reversed stagger structure with a channel length (L) of 200 µm and a channel width (W) of 1000 µm were prepared.

Similarly, inventive TFT element Nos. 3 and 4 were prepared by changing the gate electrode and the substrate as shown in Table 2.

3. Performance Evaluation

For each of the obtained TFT elements, TFT transfer characteristics at a drain voltage Vd in a saturation region of 40 V (gate voltage Vg: −20 V≦Vg≦40 V) were measured, and field effect mobility and ON-OFF ratio of the TFT were evaluated. The measurement of the TFT transfer characteristics was executed using a semiconductor parameter analyzer 4156C (manufactured by Agilent Technologies).

—Method of Calculating Field Effect Mobility—

The field effect mobility 1 in a saturated region is calculated using the TFT transfer characteristics in accordance with the following equation.

$$\mu = (2L/W \times C_{ox}) \times (\partial Id^{1/2}/\partial Vg)$$

Herein, L represents a channel length, W represents a channel width, $C_{ox}$ represents an electrostatic capacity of a gate insulating layer, Id represents a drain current, and Vg represents a gate voltage.

—Method of Calculating ON-OFF Ratio—

The ON-OFF ratio is determined from a ratio ($Id_{max}/Id_{min}$) of a maximum value $Id_{max}$ to a minimum value $Id_{min}$ in drain current Id, from among the TFT transfer characteristics.

The obtained TFT characteristics are shown in Table 2. It is shown in Table 2 that the inventive TFT element Nos. 1 and 2 exhibit excellent performance such as large field effect mobility and high ON-OFF ratio. On the contrary, the comparative TFT element No. 1, which has a configuration with only one active layer having moderate electric conductivity, exhibits small field effect mobility. The comparative TFT element No. 2, which includes a first active layer having small electric conductivity and a second active layer having large electric conductivity, exhibits extremely low ON-OFF ratio. The inventive TFT element Nos. 3 and 4 also show excellent effects of the invention.

As is clear from the above results, it is revealed that, by a configuration of the invention including a first active layer having large electric conductivity and a second active layer having small electric conductivity, unexpectedly excellent performance such as large field effect mobility and high ON-OFF ratio is obtained.

TABLE 2

| Element No. | Substrate | Gate Electrode/ Thickness (nm) | First Active Layer Deposition Condition | First Active Layer Thickness (nm) | Second Active Layer Deposition Condition | Second Active Layer Thickness (nm) | Element Performance Mobility ($cm^2/Vs$) | Element Performance ON-OFF Ratio |
|---|---|---|---|---|---|---|---|---|
| Inventive Element No. 1 | Glass | ITO/30 | Condition 2 | 10 | Condition 4 | 40 | 15.3 | $1.4 \times 10^6$ |
| Inventive Element No. 2 | Glass | ITO/30 | Condition 1 | 10 | Condition 4 | 40 | 17.2 | $2.7 \times 10^6$ |
| Comparative Element No. 1 | Glass | ITO/30 | Condition 3 | 50 | — | — | 4.3 | $9.0 \times 10^5$ |
| Comparative Element No. 2 | Glass | ITO/30 | Condition 4 | 10 | Condition 1 | 40 | 4.2 | 1.4 |
| Inventive Element No. 3 | Glass | Mo/40 | Condition 2 | 30 | Condition 5 | 20 | 33.2 | $3.4 \times 10^6$ |
| Inventive Element No. 4 | PEN | Mo/40 | Condition 1 | 10 | Condition 4 | 40 | 21.1 | $2.2 \times 10^6$ |

Example 2

Using the inventive or comparative thin film field effect transistor prepared in Example 1, radiation imaging elements shown in FIG. 4 were fabricated. The performance of each of the obtained radiation imaging elements was evaluated. As a result, reflecting the performance of the thin film field effect transistor, the radiation imaging element using the thin film field effect transistor according to the invention, which has high carrier mobility and excellent ON-OFF ratio, accompanies a smaller amount of noise and provides a radiation image with high image quality.

Symbols used in Figures are explained below.

| | |
|---|---|
| 1: | Selenium-based amorphous semiconductor layer (a-Se-based semiconductor layer) |
| 2: | Common electrode (for applying bias voltage) |
| 3: | Active matrix substrate |
| 4: | Collecting electrode |
| 5: | Signal output portion |
| 5A: | Capacitor |
| 5B: | Thin film field effect transistor |
| 6: | Gate driver |
| 8: | Multiplexer |
| 9: | A/D converter |
| 51: | Active matrix substrate |
| 52: | a-Se-based semiconductor layer |
| 53: | Common electrode |
| 100: | TFT substrate |
| 102, 122: | Gate electrode |
| 103, 113, 123: | Gate insulating layer |
| 104, 114: | Active layer |
| 104-1: | Second region |
| 104-2: | First region |
| 105-1, 105-21: | Source electrode |
| 105-2, 105-22: | Drain electrode |
| 106: | Insulating layer |
| 107: | High oxygen concentration layer |
| 108: | Low oxygen concentration layer |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. A radiation imaging element comprising:
   radiation sensors disposed in a matrix so as to output signal charges corresponding to radiation transmitted through a subject, and
   thin film field effect transistors for readout of signals from the radiation sensors, wherein:
   each thin film field effect transistor comprises at least a gate electrode, a gate insulating layer, an active layer, a source electrode and a drain electrode;
   the active layer comprises at least a first region and a second region which has an electric conductivity larger than an electric conductivity of the first region;
   the second region is in contact with the gate insulating layer;
   the first region is disposed so as to be electrically connected between the second region and at least one of the source electrode or the drain electrode; and
   at least the first region and the second region of the active layer are formed as separate layers on a substrate of the thin film field effect transistor, the layer of the second region is in contact with the gate insulating layer, and the layer of the first region is in contact with at least one of the source electrode or the drain electrode.

2. The radiation imaging element according to claim 1, wherein the layer of the first region is thicker than the layer of the second region.

3. The radiation imaging element according to claim 1, wherein, in the active layer, the electric conductivity continuously changes between the first region and the second region.

4. The radiation imaging element according to claim 1, wherein the active layer comprises an oxide semiconductor.

5. The radiation imaging element according to claim 4, wherein the oxide semiconductor comprises an amorphous oxide semiconductor.

6. The radiation imaging element according to claim 4, wherein an oxygen concentration of the second region is lower than an oxygen concentration of the first region.

7. The radiation imaging element according to claim 4, wherein the oxide semiconductor comprises at least one of indium (In), gallium (Ga), zinc (Zn) or a composite oxide of one or more of In, Ga or Zn.

8. The radiation imaging element according to claim 7, wherein the oxide semiconductor comprises In and Zn, and a composition ratio of Zn to In (expressed by a ratio Zn/In of Zn to In) of the first region is larger than a composition ratio Zn/In of the second region.

9. The radiation imaging element according to claim 1, wherein the electric conductivity of the second region is $10^{-4}$ $Scm^{-1}$ or more and less than $10^2$ $Scm^{-1}$.

10. The radiation imaging element according to claim 9, wherein the electric conductivity of the second region is $10^{-1}$ $Scm^{-1}$ or more and less than $10^2$ $Scm^{-1}$.

11. The radiation imaging element according to claim 1, wherein a ratio of the electric conductivity of the second region to the electric conductivity of the first region (electric conductivity of second region/electric conductivity of first region) is from $10^1$ to $10^{10}$.

12. The radiation imaging element according to claim 11, wherein the ratio of the electric conductivity of the second region to the electric conductivity of the first region (electric conductivity of second region/electric conductivity of first region) is from $10^2$ to $10^{10}$.

13. The radiation imaging element according to claim 12, wherein the ratio of the electric conductivity of the second region to the electric conductivity of the first region (electric conductivity of second region/electric conductivity of first region) is from $10^2$ to $10^8$.

14. The radiation imaging element according to claim 1, wherein a substrate of the thin film field effect transistor is a flexible resin substrate.

* * * * *